UNITED STATES PATENT OFFICE.

ROBERT E. DIVINE, OF CINCINNATI, OHIO.

SULFONATED-MINERAL-OIL-SLUDGE PRODUCT AND PROCESS OF MAKING.

1,301,662.  Specification of Letters Patent.  Patented Apr. 22, 1919.

No Drawing.  Application filed April 16, 1917. Serial No 162,456.

*To all whom it may concern:*

Be it known that I, ROBERT E. DIVINE, a citizen of the United States, and residing at Cincinnati, in the county of Hamilton and State of Ohio, have invented a new and useful Sulfonated-Mineral-Oil-Sludge Product and Process of Making, of which the following specification is a full disclosure.

My invention relates to a process for producing certain new and valuable products from mineral oil sulfonic sludge and to the resultant products. Sludges resulting from the sulfonation of mineral oils contain sulfonic acids having the valuable property of hydrolyzing fats and capable of being combined with other elements for the manufacture of detergent.

The object of my invention is to form from mineral oil sludge certain water-soluble salts of sulfonic acid and of these calcium or barium water-soluble sulfonates.

A further object of the invention is to separate the sulfonic component of the sludge from the color components of the sludge, so as to produce substantially colorless mineral oil sulfonic products.

Another object of the invention is to produce a substantially colorless sulfonic body from the sulfonated mineral oil sludge, by water-extracting the sulfonic acids and other soluble sludge components, from the sludge mass, neutralizing the solution with an alkali earth, preferably lime, and salting out the sulfonate, free from sludge coloring matter.

Superior results have been obtained by treating a mineral oil distillate, such as illuminating oil, with $SO_3$ in gaseous form diluted with air and separating the resultant sludge. This sludge is a heavy, viscous, semi-liquid body smelling strongly of $SO_2$ gas.

This particular sludge is desirable for my purpose because it contains about forty per cent. (40%) of sulfonic acid, some free sulfuric acid, coloring matter, unknown bodies, and only about ten per cent. (10%) of free oil which has to be removed. The sulfonic acid content of this sludge when separated, is very soluble in water, in fact, more readily soluble in water than in ether, and further characterized by the unique property of forming water-soluble combinations with earth metals, such as calcium. In these respects, the sulfonic acids obtainable from my process differ from the mineral oil sulfonic acids, with which I have been heretofore familiar.

I therefore take a sludge produced from sulfonating mineral oil, containing very water-soluble sulfonic acids, and dissolve one hundred parts of sludge into one hundred and fifty to two hundred parts of water, and allow it to stand for eight or twelve hours. Much heat is generated, sulfur-dioxid fumes are evolved, and the free oil will rise to the surface and is decanted. The under layer is a clear, dark-colored liquid, in which a rose purple color is discernible. To this liquid, I add sufficient lime to neutralize the solution and a portion of the lime combining with the free sulfuric acid is precipitated and filtered off from the solution of the calcium sulfonate, resulting from the combination of the lime with the sulfonic acid and the accompanying highly colored impurities.

This solution is a clear, red-wine color liquid, to which I add sodium chlorid up to about twenty per cent. (20%) of the weight of the solution, and the mineral calcium sulfonate separates out of the saline solution, which retains the coloring matters and is recovered by filtration and freed from liquid by pressing, or other suitable means. This body may be characterized as a water-soluble mineral oil calcium sulfonate, of light yellow color, plastic, sticky, of distinct aromatic odor, readily soluble in cold water, giving a neutral solution.

When the materials are used in substantially the proportions indicated, one hundred pounds of sludge yields approximately from fifty to sixty pounds of the calcium compound. The invention is not limited to the illustrating proportions stated, nor to the origin or method of producing the sludge, nor to the specific calcium combination. Calcium, barium, magnesium, aluminum, form water-soluble sulfonates, in like manner. An alkali earth metal sulfonate of mineral oil sulfonic acid, may be commercially used for saponifying purposes or for producing detergents, or it can be used as a base for the production of sulfonic acids. The calcium and magnesium sulfonates being freely soluble in water, detergents prepared from these sulfonic acids are perfectly adapted to usage in hard water without the disadvantages commonly attending the use of a soap.

Further, detergents made from these acids are eminently suited for use in salt water and will produce a copious lather in sea water.

Preferably, I employ a selected member of the alkali or earthy metal bases, functioning to neutralize the sulfonic acid solution, and having the property of forming sulfates relatively insoluble in water, and sulfonates readily soluble in water but capable of being salted out of the solution.

The alkali earth-metal sulfonates of this sludge sulfonic acid, are quite distinctive from the sulfonates formed by the Petroff process (Patent 1,087,888) in that they are readily soluble in water, and hence are available for a variety of commercial uses for which the Petroff sulfonates are unavailable, in addition to which, the series of alkali earth metals herein disclosed constitute a convenient sulfonic saponifying vehicle from which the sulfonic acids may be readily obtained for commercial purposes.

Having described my invention, I claim:—

1. The process of making sulfonates from sludge formed by sulfonating a portion of the contents of a mineral oil distillate, which consists in dissolving the acid sludge in water, removing any free oil, treating the water solution with a neutralizing material capable of combining with the free sulfuric acid to form a precipitate insoluble in water, and at the same time forming a water-soluble combination with the sulfonic acid, filtering off the precipitate, then salting from the separated solution the water-soluble sulfonate of the neutralizing material, and separating the mineral oil sulfonate from the saline solution.

2. The process of making sulfonates from sludge formed by sulfonating a portion of the contents of an oil of petrolic origin, comprising, mixing the sludge with water, separating the water solution from the undissolved sludge contents, adding to the water solution a base having the property of forming with the acids in solution, sulfates insoluble in water, and sulfonates soluble in water, and salting out the said sulfonates from said solution.

3. A mineral oil sulfonate, consisting of an alkali earth metal salt of a sulfonic acid formed by sulfonating a portion of the contents of a mineral oil distillate, said salt being substantially a light colored solid body, slightly aromatic, readily soluble in water, giving a substantially neutral solution, and having appreciable detergent properties.

4. A mineral oil sulfonate of a sludge sulfonic acid formed by sulfonating a portion of the contents of a mineral oil distillate, consisting of a body having detergent properties, readily soluble in water, substantially neutral, and the sulfonic acid component of which is more readily soluble in water than in ether.

5. The herein described process of forming a substantially colorless alkali earth metal sulfonate from sludge formed by sulfonating a portion of the contents of a mineral oil distillate, which consists in making a solution of the sludge, treating with an alkaline earth to combine with the sludge sulfonic acid in solution, and salting the sulfonate from the solution with a reagent which will leave the sludge coloring components in solution and separating the sulfonate from the colored sludge solution.

6. The herein described process of producing sulfonic bodies which consists in sulfonating a portion of the contents of a mineral oil distillate, separating the sludge, mixing with water, separating the solution containing sulfonic bodies, converting them into sulfonates, and salting said sulfonates out of the solution.

7. The herein disclosed process of forming a substantially colorless alkali-earth metal sulfonate from sludge formed by sulfonating a portion of the contents of a mineral oil distillate, which consists in mixing the sludge with water, removing the oil which separates from the aqueous solution of sulfonic acids and other soluble bodies, treating with an alkali earth to combine with the sulfonic acids, and salting the sulfonate from solution.

8. The herein disclosed sulfonates of sulfonic acids water-extracted from a sludge formed by sulfonating a portion of the contents of an oil of petrolic origin, consisting of a neutral body having detergent properties, the sulfonic acid components of which are more readily soluble in water than in oil.

In witness whereof, I hereunto subscribe my name, as attested by the two subscribing witnesses.

ROBERT E. DIVINE.

Witnesses:
  M. SMITH,
  L. BECK.